(12) United States Patent
Pisot et al.

(10) Patent No.: US 6,451,245 B2
(45) Date of Patent: Sep. 17, 2002

(54) OXY-FUEL TORCH WITH A SINGLE CONTROL FOR THE VALVES

(75) Inventors: Philippe Pisot, Presles (FR); Gilles Cannet, Parmain (FR); Gervais Lemesle, Saint Ouen l'Aumone (FR)

(73) Assignees: La Soudure Autogene Francaise, Paris (FR); L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 1 day.

(21) Appl. No.: 09/748,209

(22) Filed: Dec. 27, 2000

(30) Foreign Application Priority Data

Dec. 27, 1999 (FR) .............................. 99 16529

(51) Int. Cl.⁷ ................................................ B23K 7/10
(52) U.S. Cl. .......................................... 266/77; 266/48
(58) Field of Search ...................... 266/48, 77; 148/194

(56) References Cited

U.S. PATENT DOCUMENTS

| 4,572,483 A | * | 2/1986 | Leu ............................... 266/48 |
| 4,915,360 A | * | 4/1990 | Goulet et al. .................. 266/48 |
| 5,470,227 A | | 11/1995 | Mims et al. |
| 5,667,193 A | * | 9/1997 | Chrzanowski ............... 251/104 |
| 5,772,954 A | * | 6/1998 | Edenfield ..................... 266/48 |
| 5,792,281 A | | 8/1998 | Diehl |

FOREIGN PATENT DOCUMENTS

| DE | 23 26 125 | 9/1974 |
| EP | 0 895 026 | 2/1999 |
| FR | 2 728 059 | 6/1996 |
| FR | 2 731 266 | 9/1996 |
| FR | 2 770 657 | 5/1999 |

* cited by examiner

*Primary Examiner*—Scott Kastler
(74) *Attorney, Agent, or Firm*—Young & Thompson (57) ABSTRACT

The invention relates to an oxy-fuel torch. The torch comprises a body (10) comprising a number of pipes for conveying at least two streams of gas between inlets (14, 15) and outlets; at least two valves (16, 20, 22) mounted in said body capable of adopting a closed rest position and an open active position; a single control (12) for said valves and mounted so that it can move on the body and able to be moved so that it collaborates with said valves, capable of adopting a first stable position in which all the valves are at rest and at least one second stable position in which at least one of the valves is in the active position; controllable means (40) of locking said control (12) so as to secure it, at rest, to said body; and at least one controllable delivery adjusting means (46, 48) mounted on said body for adjusting the delivery of at least one of said streams of gas.

31 Claims, 6 Drawing Sheets

OXY-FUEL TORCH WITH A SINGLE CONTROL FOR THE VALVES

BACKGROUND OF THE INVENTION

The subject of the present invention is an oxy-fuel torch and, more particularly, a system for controlling such a torch comprising at least three or four valves, and a single control for said valves collaborating with these and capable of adopting a first position in which said valves are at rest and a second stable position in which at least one of said valves is in the active position.

DESCRIPTION OF THE PRIOR ART

In the known way, oxy-fuel torches can be classified into three categories according to their use.

There are torches for cutting, also known as "flame cutters" which, on the one hand, use a fuel gas such as $C_2H_2$ and, on the other hand, use oxygen as oxidizing agent. In these torches, it is necessary to supply gas to the pilot flame, when they have one, and to mix the gases to produce the heating flame and finally to provide a separate supply of oxygen to obtain the cutting jet.

In another category, in the case of heating or welding torches, also known as "blow torches" or "welding torches", respectively, all that is required is for the fuel, for example acetylene, to be mixed with oxygen to supply the main flame and supply the pilot flame.

However, in both instances, it is necessary, during the various stages of use (igniting the pilot, igniting the heating flame, possibly producing the cutting jet, extinguishing the main flame), to check the rate of delivery of the fuel and of the oxidizing agent so as to obtain the respective characteristics of heating, welding or cutting as desired, and to synchronize the successive phases of supplying the two gases, namely fuel and oxidizing agent.

In conventional torches, the control for opening and closing the supply of the two gases and for adjusting the delivery of these two gases is achieved using different controls.

In order to overcome these drawbacks, it has already been proposed for the controls for the supply of the two gases to be combined, for example as in the case of the torch described in document FR-A-2695458.

It has also been proposed for torches to be supplied that comprise a single device for controlling the gases and for ignition. A device such as this is described, for example, in document FR-A-2731266 or DE-A-2326125.

Other torches or control systems for torches are also described in the documents: U.S. Pat. Nos. 5,470,227, 5,792,281, EP-A-0895026 or FR-A-2770657.

However, in the case of the torches disclosed in these documents, while the technical arrangements described therein can sometimes lead to an improvement in the efficiency or operation of the torch in question, they do present certain drawbacks, and, in particular, in the case of some of them, that of encouraging incorrect use or inadvertent triggering.

Specifically, it can happen that the torch falls onto its control button or alternatively that, on a work site for example, the torch supply hoses become caught up in plant and that the torch, thus dragged along the ground, butts up against an obstacle, causing it to be unintentionally lit or causing the gases to be inadvertently switched on.

It can also happen that someone inexperienced attempts to extinguish a lit torch and incorrectly shuts the valves, allowing gas to leak or causing flashback.

Furthermore, it is also necessary to be able to adjust the delivery of fuel gas and the delivery of oxidizing gas delivered by the torch accurately.

In addition, it is also advantageous to be able to perform all or some of these adjustments during an initial phase and then to keep these adjustments for later use, that is to say after the torch has been put out a number of times. This is because such a possibility of preserving the settings makes it easier to carry out ignition to start with and avoids the phenomena of popping, the emission of smoke at the time of ignition and/or flaring.

With this as a starting point, one object of the present invention is therefore to provide an oxy-fuel torch which makes controlling the supply of gas to the torch simpler and safer and which allows the delivery settings for the oxidizing gas, such as the oxygen, and for the fuel gas, such as acetylene, to be memorized.

SUMMARY OF THE INVENTION

The solution of the invention is therefore a torch, particularly of the oxy-fuel type, comprising:

a body comprising a number of gas pipes for conveying at least two streams of gas between a number of inlets and a number of outlets;

at least two valves mounted in said body and capable of adopting a rest position in which the corresponding stream of gas is interrupted in at least one of said gas pipes and an active position in which the passage of the stream of gas is allowed through at least one of said gas pipes;

a single control for at least said two valves and mounted so that it can move on said body and able to be moved in a path so that it collaborates with at least said valves, said control being capable of adopting a first stable position in which said two valves are at rest and at least one second stable position in which at least one of said valves is in an active position;

controllable means of locking said control so as to secure, at rest, said control to said body, at least in said first position, and which can be actuated by hand to free said control from said body; and at least one controllable delivery adjusting means mounted on said body for adjusting the delivery of at least one of said streams of gas, said adjusting means comprising a mobile control element.

Depending on the case, the torch of the invention may comprise one or more of the following features:

said control for said valves can be moved in translation in the direction of a longitudinal axis of said body;

it comprises an ignition system of the piezo-electric type;

it comprises two delivery adjusting means, each adjusting means being associated with one gas, particularly with oxygen, on the one hand, and with a fuel gas, such as acetylene, on the other hand;

the mobile control element is a rotary handwheel, preferably a rotary handwheel the position of which is indicative of the gas delivery adjusted;

each adjusting means comprises a tap comprising a tap body, a moving needle and a seat, and a handwheel being mounted so that it can rotate on said tap body so as to cause said needle to move;

at its active end, the needle comprises a delivery-adjusting axial portion and an annular sealing surface, said seat comprising an axial passage equipped with a zone with a progressive profile capable of collaborating with the adjusting portion of the needle so as to adjust the delivery of gas and an annular sealing rib surrounding said axial passage and capable of collaborating with said sealing surface when said needle is brought into its closed position;

each valve comprises a seat and a mobile shutter equipped with a control stem which has a control end, and said control comprises a slider external to the body of said torch and a cam secured to said slider, said cam being capable of collaborating or of not collaborating with the control end of the control stems of said valves according to the position of said slider;

said locking means comprises a push-button mounted so that it can move with respect to said slider and capable of adopting a rest position in which said slider is secured to the body of the torch and an active position in which said slider is free with respect to said body;

it comprises at least three valves, preferably at least four valves.

it comprises a first valve for controlling the fuel gas to deliver a pilot flame; a second and third valve for, respectively, controlling the main flame fuel gas and for controlling the main flame oxygen, the second valve also, on a branch, supplying the pilot flame ignition system; and a fourth valve for controlling the oxygen for the cutting jet. Said first, second and third valves are on/off valves and said fourth valve can be adjusted progressively. This version of torch is recommended for cutting a piece in which one of the gases is oxygen and the other gas is a fuel, said torch delivering a pilot flame, a main heating flame and a cutting jet;

it comprises means for defining a second stable position of said control in which position said first and fourth valves are in the rest position and the second and third valves are in the active position; it preferably also comprises means for defining a third stable position in which said second, third and fourth valves are in the active position and the first valve is in the rest position. Said third stable position of the slider corresponds to the second end of its path and said locking means adopts its rest position when said slider is in its first stable position at a first end of its path and when said slider is in its third stable position corresponding to the second end of its path;

as an alternative, it comprises a first valve for controlling the fuel for the pilot; a second valve for controlling the fuel for the heating flame; a third valve for controlling a system for igniting the pilot flame; and a fourth valve for controlling the oxygen for the heating flame; said valves preferably being of the on/off type. This version of the torch is preferred for heating a piece in which one of the gases is oxygen and the other gas is a fuel, said torch delivering a pilot flame and a main heating flame, said pilot flame being brought about by operating the ignition system. It comprises means for defining said second stable position of the control and, in this position, said second and fourth valves are in the active position and said first and third valves are at rest;

according to another alternative form, it comprises a first valve for supplying the main flame with oxygen; a second valve for supplying the main flame with fuel; and a third valve for supplying the pilot with fuel; said three valves preferably being of the on/off type. This version is preferred when two pieces are to be welded and one of the gases is oxygen and the other is a fuel gas, said torch delivering a pilot flame and a main welding flame.

More generally, the invention also relates to a torch comprising:

a body comprising a number of gas pipes;

at least two valves mounted in said body and capable of adopting a rest position in which the corresponding stream of gas is interrupted in at least one of said gas pipes and an active position in which the passage of the stream of gas is allowed through at least one of said gas pipes;

a single control for at least said two valves and mounted so that it can move on said body, collaborating with at least said valves and capable of adopting a first stable position in which said valves are at rest and at least one second stable position in which at least one of said valves is in the active position; and at least one delivery adjusting means comprising a mobile control element and controllable so as to adjust the delivery of at least one of said streams of gas.

there are preferably two delivery adjusting means which are associated with each of the two gases consisting, respectively, of the oxidizing gas, such as oxygen, and the fuel gas, such as acetylene. Each adjusting means comprises a mobile control consisting of a rotary handwheel the angular position of which is indicative of the gas delivery in the gas pipe in question.

Using the torch of the invention, the implementation of the various phases of supply to the torch, whether it is a cutting, heating or welding torch, is carried out by actuating one single control and, in addition, this control is preferably equipped with a device for locking in at least the "off" position, thus avoiding accidental supply to the torch.

It will also be understood that by virtue of the presence of the one or more means for adjusting the delivery of at least one of the gases distinct from the torch gas supply valves, the various settings can be memorized and/or preserved even after the torch has been extinguished.

Furthermore, this separation between the controls by valves which may be of the on/off type, and the delivery adjusting members makes it possible to make the delivery adjusting means far more effective and accurate.

In the context of the present invention, the words "gas pipe" are used to denote any duct, line or passage or any other gas circuit formed in the body of the torch and allowing the various streams of gas to be transported within said torch body.

BRIEF DESCRIPTION OF THE DRAWINGS

Other features and advantages of the invention will become better apparent from reading the description which follows of a number of embodiments of the invention which are given by way of nonlimiting examples with reference to the appended figures in which.

DESCRIPTION OF THE PREFERRED EMBODIMENTS

Figure 1:
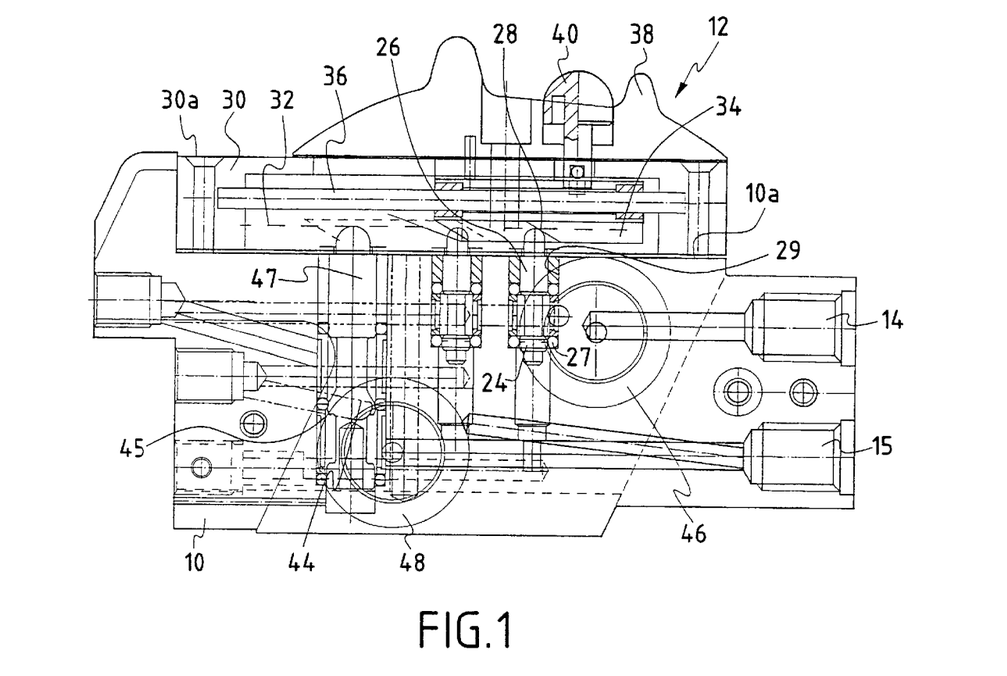
FIG. 1 is a view in vertical section of the body of a cutting torch, also known as a "flame cutter"
Figure 2:
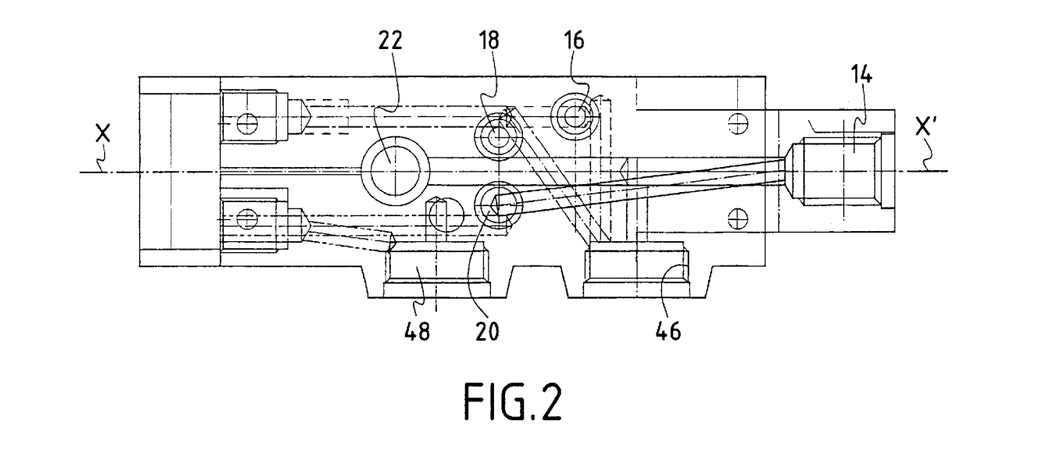
FIG. 2 is a view from above of the body of the torch of FIG. 1, the control being omitted.
Figure 3:
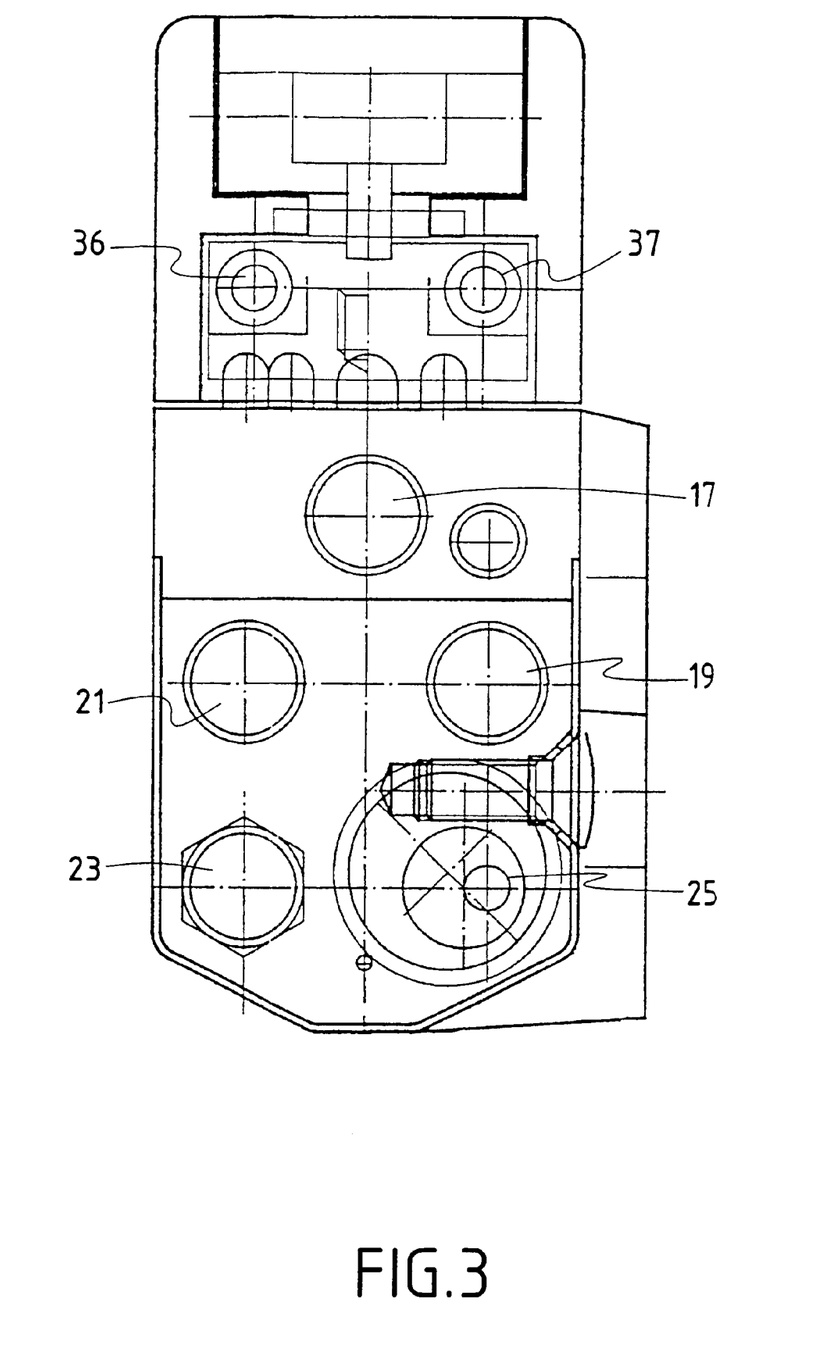
FIG. 3 is a view from the left of the body of the torch of FIG. 1.

Referring first of all to FIGS. 1 to 3, one embodiment of a cutting torch according to the invention will be described.

These figures depict the body 10 of the torch on which a single control 12 is mounted so that it can slide. The torch body comprises a fuel gas inlet 14 and an oxygen inlet 15 or inlet for any other oxidizing gas. The control of the supply of the two gases for supplying the pilot, the main flame and the cutting jet is obtained using four valves which are best visible in FIG. 2, mounted on gas pipes pierced in the body 10 and connecting the gas inlets 14 and 15 to the cutting oxygen outlet 17, heating oxygen outlet 19, heating fuel outlet 21 and pilot fuel outlet 23 (cf. FIG. 3). There is a first valve 16 for controlling the fuel supply to the pilot, a second valve 18 for controlling the main flame fuel, a third valve 20 for controlling the oxygen in the heating flame and for activating the ignition system 25 of the pilot which is of the piezo-electric type, and a fourth valve 22 for controlling the oxygen to create the cutting jet.

In the embodiment considered, the values 18 and 20 are arranged in one and the same plane orthogonal to the axis XX' of the torch body. The valves 16, 18 and 20 are of the on/off type. Each of these valves comprises a seat 27 and a moving shutter 24 mounted so that it can move in a bore 29 made in the body of the torch. The shutter 24 is extended by a control stem 26 comprising a control head 28. The control heads 28 of the valves 16 to 22 in their rest position depicted in the figures, project out of the upper face 10a of the torch body. In their rest position depicted in FIG. 1, the valves 16 to 20 are in the closed position. Synchronized control of the various valves 16 to 22 is provided via the single control 12 which is mounted so that it can move in translation in the translation of the axis XX' of the body of the torch via a guide piece 30 itself secured to the upper face 10a of the body 10 of the torch. The guide piece 30 has a recess 32 into which the heads 28 of the various valves project. A part forming a cam 34 which is guided in translation by guide stems 36 and 37 arranged parallel to the axis XX' can move in longitudinal translation in this recess 32. The cam 34 is secured to a slider 38 which can move in translation along the upper face 30a of the guide piece 30, the longitudinal movements of the slider being transmitted to the cam 34. The slider 38 is equipped with a locking push-button 40. At rest, the push-button 40 secures the slider to the body of the torch 10. It is necessary to depress the push-button 40 to free the slider 38 and allow it to move. The cam 34 has four ramp-like offset lateral faces allowing action on the control heads 28 of the various valves 16 to 22 in a synchronized pattern which will be explained later.

It is to be emphasized that the cutting oxygen supply valve 22 is of the type that can be adjusted progressively. For that, it comprises a shutter member 44 which has the desired profile 45 for obtaining the desired curve of delivery as a function of the displacement of its control stem 47.

The torch is also equipped with two delivery control taps, one for the oxygen and one for the fuel. FIGS. 1 to 3 show the tapped bosses 46 and 48 into which these adjusting taps are fitted, which taps will be described later in conjunction with FIG. 4. It is sufficient to recall that each tap comprises an operating handwheel and that the range of adjustment corresponds to slightly less than one turn, and so the position of the handwheel directly indicates the adjustment. These taps take a graduated ring which is positioned after the needle has been mounted on the body, and which allows precise and economical indexing even with conventional machining. These taps can be replaced in the event of wear or damage following an impact, for example, with the same simple indexing procedure.

These taps are used only to adjust and not to open and close the gas passages and are therefore far lighter in duty than the taps on conventional torches. However, with a view to the reliability and durability of this appliance, their design separates the functional surfaces that are to provide sealing from those which are to throttle the delivery.

These taps allow the gas deliveries to be adjusted beforehand, without the flame having been lit. As a preference, the way in which the appliance is used therefore gives an indication of the mean position of each of the taps for each type or size of nozzle that is to be fitted to the torch. With this preliminary adjustment, the flame can be lit correctly; if the user wishes to refine or customize his settings, he may operate the taps again.

By virtue of these separate means for controlling the opening and closing of the gas passages, the flame can be extinguished without touching the taps. Thus, the refined or customized settings are not lost. Any user who has frequently to change nozzle or to carry out different types of work requiring different settings may also devise his own chart and apply it, making reference to the indexes on the handwheels. Such taps thus contribute to the ease and consistency of the work, while saving time and gas.

Figure 5:
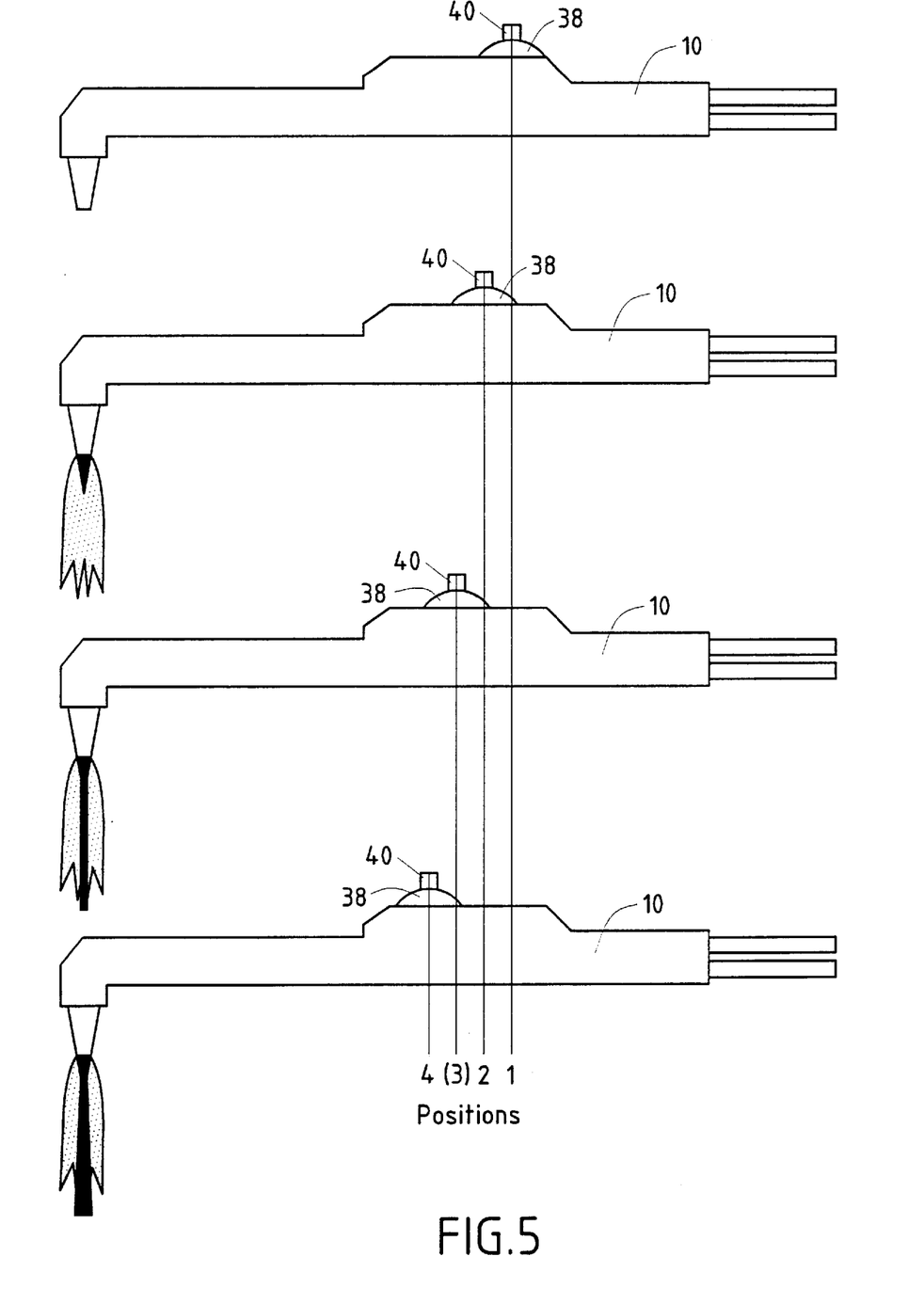
FIG. 5 is a diagrammatic view showing the various positions of the control for the torch of FIG. 1.

Referring now to FIGS. 1, 2 and 5, the use of the cutting torch according to the invention will be described. When switched off, the slider 38 of the control means occupies an extreme position 1 depicted in FIG. 1. In this position, the locking push-button 40 is at rest and immobilizes the slider 38. In position 1, the cam 34 does not act, via any of its active faces, on any of the control heads of the valves 16 to 22 and these are therefore all closed. The locking using the push-button 40 prevents any accidental operation to the torch.

To make use of the torch, the user depresses the locking button 40 and gradually moves the slider and therefore the cam 34. The latter causes the opening, in turn, of the heating oxygen circuit valve, the heating fuel circuit valve and the pilot fuel circuit valve, also, in this last position, giving rise to the activation of the ignition system which, for example, consists of a piezo-electric system. Thus, the pilot and the main flame are lit in turn.

When the slider reaches a position 2 defined by a hard point and which is therefore a stable position, the cam occupies a position such that the valves 18 and 20 remain open while the valve 16 is closed, extinguishing the pilot. Furthermore, in this position, the cam has not yet begun to cause the cutting oxygen supply valve 22 to open. If the slider is moved further, beyond its position 2, that is to say to the left in the case of FIG. 1, the cam 34 keeps the valves 18 and 20 open and gradually opens the valve 22 corresponding to the cutting oxygen. A cutting jet is thus obtained, the delivery of which is progressive as a result of the proportional opening of the valve 22. When the slider 38 reaches the second end of its travel corresponding to position 4 in FIG. 5, the cutting oxygen valve 22 is fully open and the locking push-button returns to its rest position, thus immobilizing the cam 34 in the cutting position.

If there is a desire to interrupt the cutting operation while the slider is in its position 4, the locking push-button 40 is depressed and the slider returns to its position 2 under the effect of return means which have not been depicted in the figure. This movement causes the valve 22 to close and therefore shuts down the cutting jet as the slider returns to its position 2. In this position 2, which is stable by virtue of the presence of the hard spot, the torch supplies just the main flame. If there is a desire to shut the torch down completely, the slider is pushed to the right, that is to say to position 1, which causes the heating oxygen and fuel valves 18 and 20 to close. When the slider has been returned to its position 1, the heating flame is therefore interrupted and the slider is locked again by the locking push-button.

Figure 4:
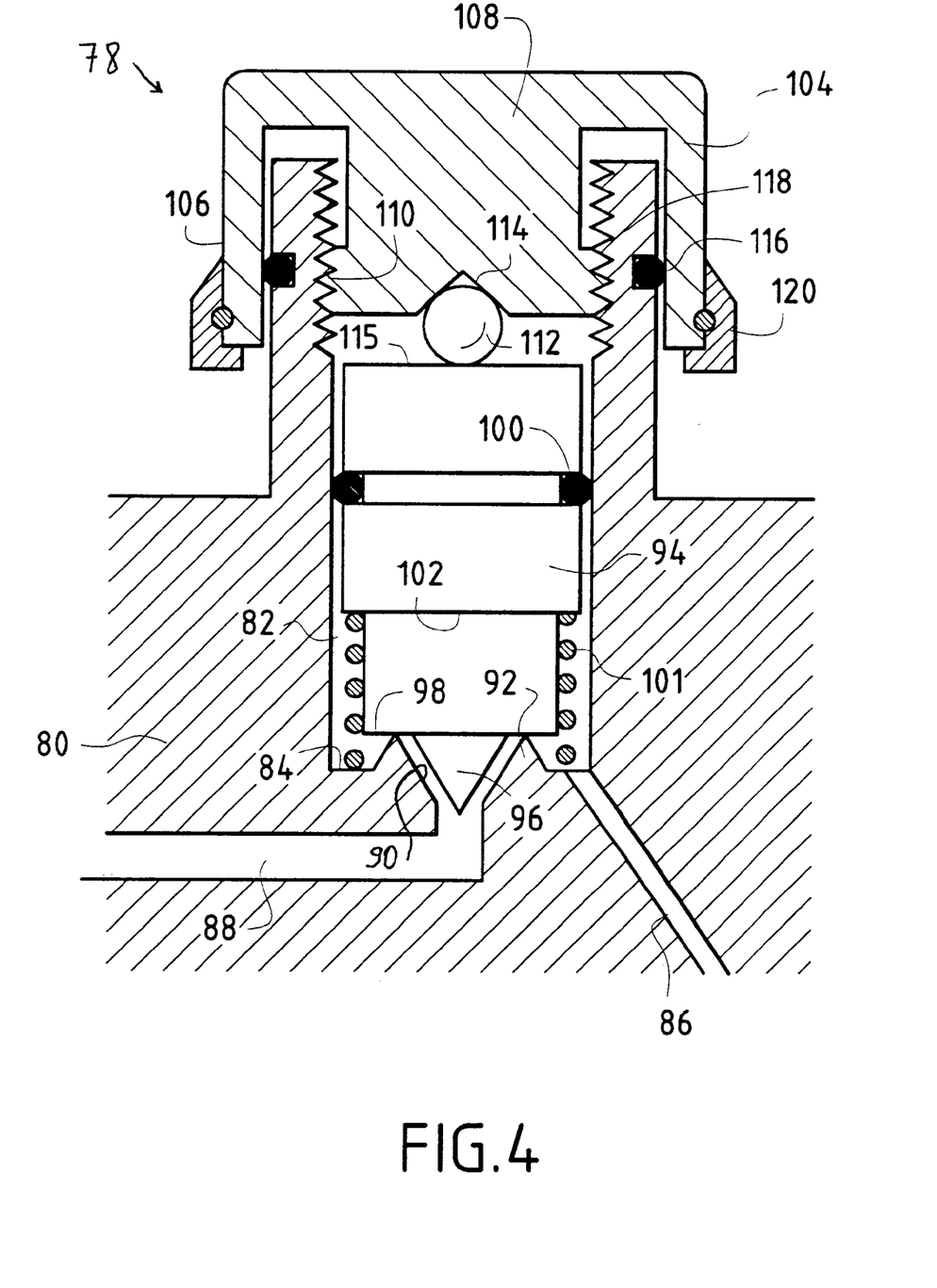
FIG. 4 is a view in vertical section of a delivery adjusting tap that can be used in the torch of FIG. 1.

Referring now to FIG. 4, one preferred embodiment of the adjusting tap 78 will be described. This tap comprises a body 80 intended to be fixed to the boss 46 or 48 of the torch body. The body 80 defines a chamber 82 of cylindrical overall shape, with a gas inlet pipe 86 and an axial gas outlet 88 opening into its bottom 84. The pipe 88 is connected to the bottom by a conical portion 90 of predetermined profile. The bottom 84 of the chamber is equipped with an annular rib 92 surrounding the conical portion 90.

Mounted in the cylindrical chamber 82 is a moving needle 94, the lower end of which defines an axial adjusting portion 96, of essentially conical shape, and a peripheral sealing zone 98 arranged opposite the rib 92. The needle is equipped with a seal 100 and with a return spring 101 mounted between the bottom 84 of the chamber 82 and a shoulder 102 on the needle, and which tends to move the needle away from the bottom 84 of the chamber.

The needle 94 is controlled by a rotary handwheel 104 comprising a cylindrical operating skirt 106 and a threaded rod 108 which collaborates with a tapping 110 formed at the upper part of the chamber 84. A ball 112 is inserted between a conical recess 114 made at the end of the rod 108 and the upper end 115 of the needle. This method of connection between the handwheel 104 and the needle 94 makes it possible to prevent the rotational movement of the handwheel from being transmitted to the needle.

A seal 116 is inserted between the internal face of the skirt 106 and the cylindrical extension 118 of the body of the tap. The seal 116 is used to brake the handwheel 104 with respect to the body of the tap to prevent undesired handwheel rotation. Finally, a ring with an index 120 is mounted to rotate freely with respect to the body of the tap. Once initial calibration of the tap has been performed, this ring is secured to the tap body.

The operation of the tap is detailed hereinafter.

When the handwheel is brought into its closed position, the sealing zone 90 of the needle is pressed against the annular rib 92, and this interrupts the communication between the inlet 86 and the outlet 88. By contrast, when the needle is in this position, there is no contact between the adjusting part 96 of the needle and the frustoconical portion 90 of the needle seat.

By causing the handwheel 104 to turn, a corresponding movement of the adjusting portion 96 of the needle with respect to the frustoconical portion 98 is caused, making it possible to adjust the delivery.

Figure 6:
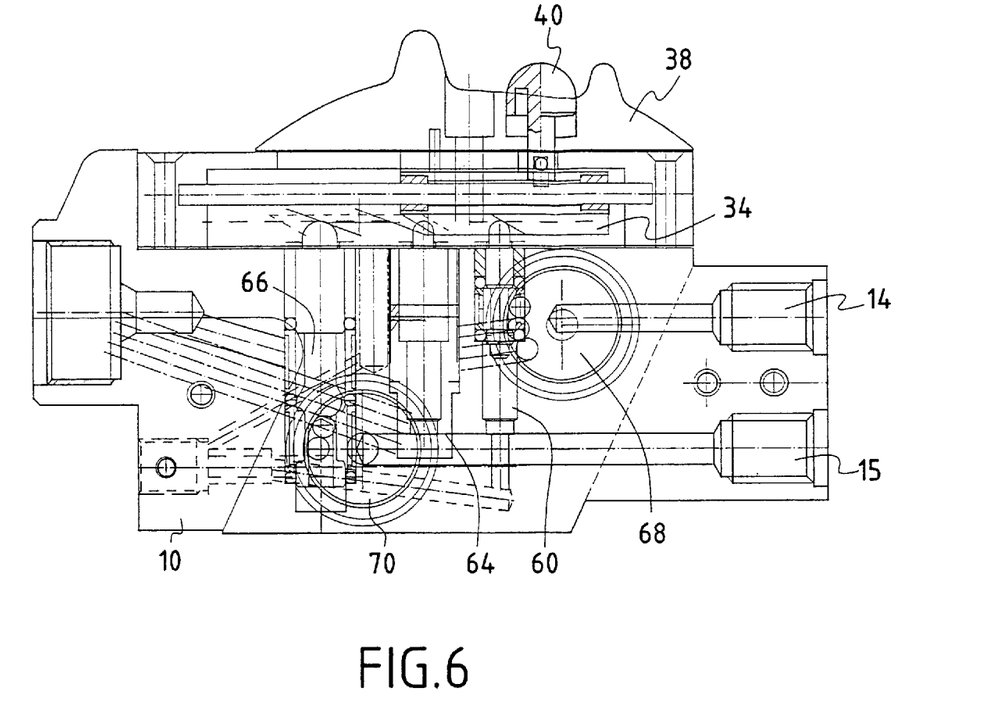
FIG. 6 is a vertical section of a body of a heating torch.
Figure 7:
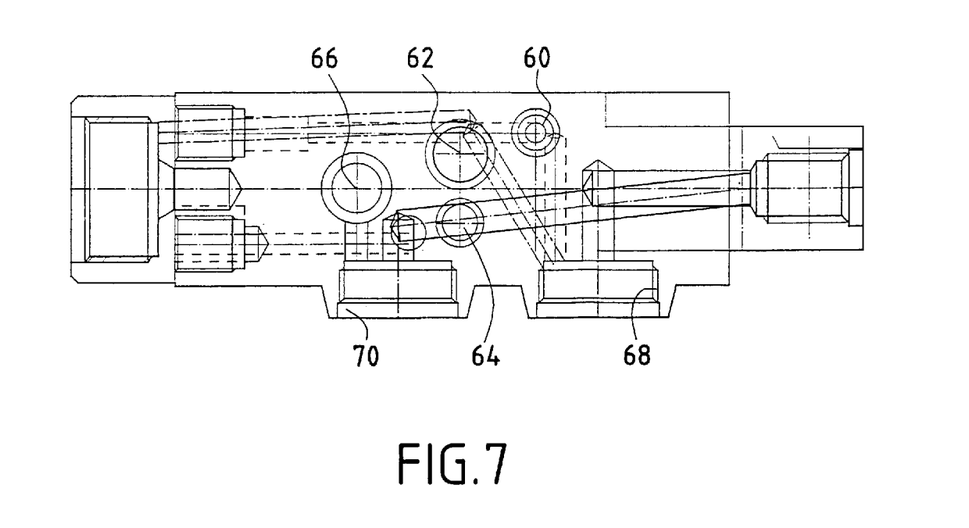
FIG. 7 is a partial view from above of the torch of FIG. 6, the control adjusters being omitted.

FIGS. 6 and 7 illustrate one embodiment of a heating torch comprising a control in accordance with the invention.

This torch can be distinguished from the one described in conjunction with FIGS. 1 to 3 only in the function of the valves and in the geometry of the ducts made in the torch body for connecting the oxygen and fuel inlets to the outlet nozzles via the four valves and the two adjusting taps.

According to this embodiment, the valve 60 is used to supply the pilot with fuel, the valve 62 is used to supply the main flame with fuel, the valve 64 is used to supply oxygen to the control of the pilot ignition system which, for example, is of the piezo-electric type, and the valve 66 is used to supply the main flame with oxygen.

The four valves 60 to 66 produce on/off control. As in the case in the torch of FIGS. 1 to 3, the oxygen and fuel gas deliveries are adjusted using two adjusting taps mounted in the tapped attachment bosses 68 and 70.

The way in which the heating torch of FIGS. 6 and 7 works is as follows.

When switched off, the slider 38 occupies a stable position at the first end of its travel and is locked in place by the push-button 40. The cam 34 does not act on any of the valve stems and the four valves are closed. To use the heating torch, the slider 38 is pushed to the left (FIG. 6) after the push-button 40 has been depressed. This movement of the slider 38 and therefore of the cam 34 causes the successive opening of the valve 66 of the heating oxygen circuit, the valve of the heating fuel circuit and the valve of the pilot fuel circuit and that of the ignition valve. The main flame is thus obtained. The slider 38 is then moved to the second end of its travel which constitutes a stable position by virtue of a hard spot.

Figure 8:
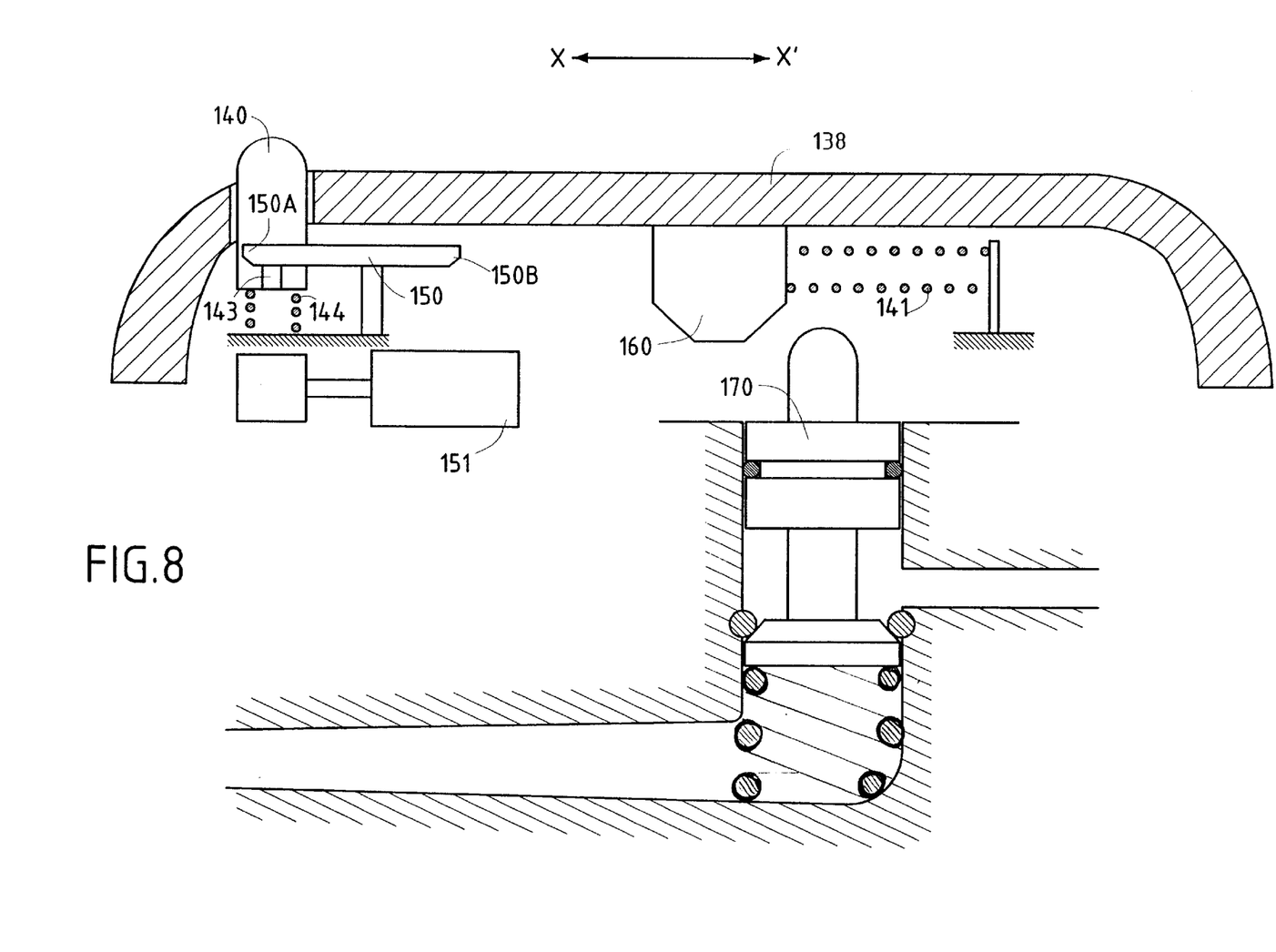
FIG. 8 is a partial view in vertical section of a body of a welding torch.

A welding torch according to the invention will be described with reference now to FIG. 8.

The slider 138 is mounted so that it can move in translation parallel to the axis XX' of the body of the torch. It is locked in the rest and work position by a push-button 140 comprising a tooth 143 which presses at the two ends 150A and 150B of a ramp 150 secured to the torch body. A return spring 144 keeps the push-button in the up position and therefore keeps the tooth pressed against the ramp when there is no deliberate action on the push-button.

Valves respectively supply oxygen to the main flame, fuel to the main flame and fuel to the pilot, only the valve 170 being depicted in the figure. The valves are activated by three cams secured to the slider 138, only the cam 130 being depicted.

In the rest position, the valves are closed. To move to the work position, the push-button 140 has to be depressed, which has the effect of disengaging the tooth 143 from the ramp 150 and thus, for example by resting the thumb on the slider, of allowing the slider 138 and therefore the cams 160 to 162 to translate, these cams, during the translational movement, acting on the valves 170 to 172.

When the slider and the secured parts reach the work position, at the end of the ramp 150, the tooth 143 comes to rest on. the end 150B of the ramp and immobilizes the slider. The first two valves are kept activated. The valve corresponding to the pilot fuel is activated only temporarily during the translational movement of the slider 138. During this temporary activation, a certain amount of fuel is sent to the pilot and, at the same time, the piezo-electric generator 151 is activated and generates a spark which ignites the pilot. The pilot ignites the main flame. To extinguish the main flame and return to the rest position, all that is required is to push the push-button 140, which has the effect of releasing the tooth 143 from the ramp. The spring 141 causes the slider 138 to return to the rest position. The tooth 143, under the effect of the spring 144, comes back to rest on the end 150A of the ramp as soon as the pressure on the push-button 140 is released.

A torch according to the invention may, according to the architectural variant considered, be used for implementing a method for cutting, welding, heating, or the like, one or more pieces of metal, particularly pieces of steel, and be so using oxygen or a gas containing oxygen as oxidizing gas, and on the other hand, using acetylene or any other fuel gas, particularly hydrocarbons, such as propane or natural gas for example.

What is claimed is:

1. A torch comprising:
   a body comprising a number of gas pipes for conveying at least two streams of gas between a number of inlets and a number of outlets;
   at least two valves mounted in said body and capable of adopting a rest position in which a stream of gas is interrupted in at least one of said gas pipes and an active position in which the passage of the stream of gas is allowed through at least one of said gas pipes;
   a single control for at least said two valves and mounted so that it can move on said body and able to be moved in a path so that it cooperates with at least said valves, said control being capable of adopting a first stable position in which said two valves are at rest and at least one second stable position in which at least one of said valves is in an active position;
   controllable means of locking said control so as to secure, at rest, said control to said body, at least in said first position, and which can be actuated by hand to free said control from said body; and
   at least one controllable delivery adjusting means mounted on said body for adjusting the delivery of at least one of said streams of gas, said adjusting means comprising a mobile control element,
   wherein said at least two valves comprise:
      a first valve for controlling a fuel gas for a pilot;
      a second valve for controlling the fuel gas for a heating flame;
      a third valve for controlling a system for igniting a pilot flame; and
      a fourth valve for controlling an oxidizing gas for the heating flame.

2. The torch as claimed in claim 1, wherein said control for said valves can be moved in translation in the direction of a longitudinal axis of said body.

3. The torch as claimed in claim 1, which comprises two delivery adjusting means, each adjusting means being associated with one gas, and/or the torch being one wherein the mobile control element is a rotary handwheel.

4. The torch as claimed in claim 3 wherein each adjusting means comprises a tap comprising a tap body, a moving needle and a seat, and a handwheel being mounted so that it can rotate on said tap body so as to cause said needle to move.

5. The torch as claimed in claim 1, wherein each valve comprises a seat and a mobile shutter equipped with a control stem which has a control end, and said control comprises a slider external to the body of said torch and a cam secured to said slider, said cam being capable of cooperating or of not cooperating with the control end of the control stems of said valves according to the position of said slider.

6. The torch as claimed in claim 5, wherein said locking means comprises a push-button mounted so that it can move with respect to said slider and capable of adopting a rest position in which said slider is secured to the body of the torch and an active position in which said slider is free with respect to said body.

7. The torch as claimed in claim 1, wherein said first, second and third valves are on/off valves and said fourth valve can be adjusted progressively.

8. The torch as claimed in claim 1, and which comprises means for defining a second stable position of said control in which position said first and fourth valves are in the rest position and the second and third valves are in the active position; and means for defining a third stable position in which said second, third and fourth valves are in the active position and the first valve is in the rest position.

9. The torch as claimed in claim 8 wherein said third stable position of the control corresponds to the second end of its path and said locking means adopts its rest position when said control is in its first stable position at a first end of its path and when said control is in its third stable position corresponding to the second end of its path.

10. The torch as claimed in claim 1, which comprises at least four valves, said valves comprising on/off valves.

11. The torch as claimed in claim 8, and which comprises means for defining said second stable position of the control and, in this position, said second and fourth valves are in the active position and said first and third valves are at rest.

12. The torch as claimed in claim 1, which comprises a piezo-electric ignition system.

13. A method for cutting, welding or heating one or more pieces of metal comprising the steps of:
   providing a torch as claimed in claim 1,
   using oxygen or a gas containing oxygen as an oxidizing gas, and
   using acetylene or at least one hydrocarbon as a fuel gas.

14. A torch comprising:
   a body comprising a number of gas pipes for conveying at least two streams of gas between a number of inlets and a number of outlets;
   at least two valves mounted in said body and capable of adopting a rest position in which a stream of gas is interrupted in at least one of said gas pipes and an active position in which the passage of the stream of gas is allowed through at least one of said gas pipes;
   a single control for at least said two valves and mounted so that it can move on said body and able to be moved in a path so that it cooperates with at least said valves, said control being capable of adopting a first stable position in which said two valves are at rest and at least one second stable position in which at least one of said valves is in an active position;
   controllable means of locking said control so as to secure, at rest, said control to said body, at least in said first position, and which can be actuated by hand to free said control from said body; and
   at least one controllable delivery adjusting means mounted on said body for adjusting the delivery of at least one of said streams of gas, said adjusting means comprising a mobile control element, and
   wherein said locking means comprises a push-button mounted so that can move with respect to said control and capable of adopting a rest position in which said control is secured to the body of the torch and an active position in which said control is free with respect to said body.

15. The torch as claimed in claim 14, wherein said control for said valves can be moved in translation in the direction of a longitudinal axis of said body.

16. The torch as claimed in claim 14, which comprises two delivery adjusting means, each adjusting means being associated with one gas, and/or the torch being one wherein the mobile control element is a rotary handwheel.

17. The torch as claimed in claim 16, wherein each adjusting means comprises a tap comprising a tap body, a moving needle and a seat, and a handwheel being mounted so that it can rotate on said tap body so as to cause said needle to move.

18. The torch as claimed in claim 14, wherein each valve comprises a seat and a mobile shutter equipped with a control stem which has a control end, and said control comprises a slider external to the body of said torch and a cam secured to said slider, said cam being capable of cooperating or of not cooperating with the control end of the control stems of said valves according to the position of said slider.

19. The torch as claimed in claim 14, and which comprises at least three valves.

20. The torch as claimed in claim 14, and which comprises:
    a first valve for controlling a fuel gas to deliver a pilot flame;
    a second valve for controlling a main flame fuel gas and a third valve for controlling the main flame oxidizing gas and the system for igniting the pilot; and
    a fourth valve for controlling the oxidizing gas for a cutting jet.

21. The torch as claimed in claim 20, wherein said first, second and third valves are on/off valves and said fourth valve can be adjusted progressively.

22. The torch as claimed in claim 20, and which comprises means for defining a second stable position of said control in which position said first and fourth valves are in the rest position and the second and third valves are in the active position; and means for defining a third stable position in which said second, third and fourth valves are in the active position and the first valve is in the rest position.

23. The torch as claimed in claim 22 wherein said third stable position of the control corresponds to the second end of its path and said locking means adopts its rest position when said control is in its first stable position at a first end of its path and when said control is in its third stable position corresponding to the second end of its path.

24. The torch as claimed in claim 14, and which comprises:
    a first valve for controlling a fuel gas for a pilot;
    a second valve for controlling the fuel gas for a heating flame;
    a third valve for controlling a system for igniting a pilot flame; and
    a fourth valve for controlling an oxidizing gas for the heating flame.

25. The torch as claimed in claim 22, and which comprises means for defining said second stable position of the control and, in this position, said second and fourth valves are in the active position and said first and third valves are at rest.

26. The torch as claimed in claim 15, and which comprises:
    a first valve for supplying a main flame with an oxidizing gas;
    a second value for supplying the main flame with a fuel gas; and
    a third valve for supplying a pilot with fuel gas.

27. The torch as claimed in claim 14, and which comprises a piezo-electric ignition system.

28. A system for controlling a torch as claimed in claim 14 comprising:
    at least three valves,
    a single control for said valves and cooperating with at least one of said valves and capable of adopting a first position in which said valves are at rest and at least one second stable position in which at least one of said valves is in the active position.

29. A method for cutting, welding or heating one or more pieces of metal comprising the steps of:
    providing a torch as claimed in claim 14,
    using oxygen or a gas containing oxygen as an oxidizing gas, and
    using acetylene or at least one hydrocarbon as a fuel gas.

30. A torch comprising:
    a body comprising a number of gas pipes for conveying at least two streams of gas between a number of inlets and a number of outlets;
    at least four valves;
    at least two of said valves being mounted in said body and being capable of adopting a rest position in which a stream of gas is interrupted in at least one of said gas pipes and an active position in which the passage of the stream of gas is allowed through at least one of said gas pipes;
    a single control for at least said two valves and mounted so that it can move on said body and able to be moved in a path so that it cooperates with at least said valves, said control being capable of adopting a first stable position in which said two valves are at rest and at least one second stable position in which at least one of said valves is in an active position;
    controllable means of locking said control so as to secure, at rest, said control to said body, at least in said first position, and which can be actuated by hand to free said control from said body; and
    at least one controllable delivery adjusting means mounted on said body for adjusting the delivery of at least one of said streams of gas, said adjusting means comprising a mobile control element.

31. A torch comprising:
    a body comprising a number of gas pipes for conveying at least two streams of gas between a number of inlets and a number of outlets;
    at least four valves mounted in said body and capable of adopting a rest position in which a stream of gas is interrupted in at least one of said gas pipes and an active position in which the passage of the stream of gas is allowed through at least one of said gas pipes;
    a single control for at least said two of said valves and mounted so that it can move on said body and able to be moved in a path so that it cooperates with at least said valves, said control being capable of adopting a first stable position in which said two valves are at rest and at least one second stable position in which at least one of said valves is in an active position;
    controllable means of locking said control so as to secure, at rest, said control to said body, at least in said first position, and which can be actuated by hand to free said control from said body; and
    at least one controllable delivery adjusting means mounted on said body for adjusting the delivery of at least one of said streams of gas, said adjusting means comprising a mobile control element,
    wherein said at least four valves comprise:
        a first valve for controlling a fuel gas to deliver a pilot flame;
        a second valve for controlling a main flame fuel gas;
        a third valve for controlling a main flame oxidizing gas and the system for igniting the pilot; and
        a fourth valve for controlling an oxidizing gas for a cutting jet.

* * * * *